United States Patent
Nguyen et al.

(10) Patent No.: US 9,862,872 B2
(45) Date of Patent: Jan. 9, 2018

(54) STABILIZING FORMATION LAMINAE IN COAL SEAM WELLBORES

(71) Applicant: Halliburton Energy Services, Inc., Houston, TX (US)

(72) Inventors: Philip D. Nguyen, Houston, TX (US); Douglas Magill, Albuquerque, NM (US); Jessica Lynn Heeter, Houston, TX (US); Billy Smith, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/114,230

(22) PCT Filed: May 9, 2014

(86) PCT No.: PCT/US2014/037474
§ 371 (c)(1),
(2) Date: Jul. 26, 2016

(87) PCT Pub. No.: WO2015/171157
PCT Pub. Date: Nov. 12, 2015

(65) Prior Publication Data
US 2017/0009124 A1    Jan. 12, 2017

(51) Int. Cl.
*E21B 33/138* (2006.01)
*C09K 8/508* (2006.01)
(Continued)

(52) U.S. Cl.
CPC ............ *C09K 8/5086* (2013.01); *C09K 8/035* (2013.01); *C09K 8/508* (2013.01); *C09K 8/602* (2013.01);
(Continued)

(58) Field of Classification Search
None
See application file for complete search history.

(56) References Cited

U.S. PATENT DOCUMENTS 3,612,181 A * 10/1971 Brooks, Jr. .............. C09K 8/56
166/295
4,368,136 A * 1/1983 Murphey ................ C08L 63/00
507/211

(Continued)

FOREIGN PATENT DOCUMENTS

WO      2013064323 A1    5/2013

OTHER PUBLICATIONS

International Search Report and Written Opinion for PCT/US2014/037474 dated Feb. 4, 2015.

*Primary Examiner* — Angela M DiTrani
(74) *Attorney, Agent, or Firm* — McDermott Will & Emery LLP

(57) ABSTRACT

Methods including introducing a treatment fluid into a wellbore in a subterranean formation, wherein the subterranean formation includes a coal seam gas reservoir, a freshwater reservoir, and formation laminae interposed therebetween, and the wellbore penetrating each, and wherein the treatment fluid comprises an aqueous base fluid and an aqueous curable resin; penetrating at least a portion of the formation laminae with the aqueous curable resin while maintaining the treatment fluid in the wellbore at a pressure sufficient to prevent the flow of freshwater from the freshwater reservoir into the wellbore; curing the aqueous curable resin, thereby stabilizing the formation laminae; creating permeability pathways in the coal seam gas reservoir itself; removing the treatment fluid from the wellbore; recovering gas from the coal seam gas reservoir.

20 Claims, 1 Drawing Sheet

(51) Int. Cl.
    *C09K 8/035*     (2006.01)
    *E21B 43/00*     (2006.01)
    *C09K 8/60*     (2006.01)
    *C09K 8/88*     (2006.01)
    *E21B 7/18*     (2006.01)
    *E21B 43/08*     (2006.01)
    *E21B 43/114*     (2006.01)
    *E21B 43/16*     (2006.01)
    *E21B 43/26*     (2006.01)

(52) U.S. Cl.
    CPC ............... *C09K 8/885* (2013.01); *E21B 7/18* (2013.01); *E21B 33/138* (2013.01); *E21B 43/006* (2013.01); *E21B 43/086* (2013.01); *E21B 43/088* (2013.01); *E21B 43/114* (2013.01); *E21B 43/168* (2013.01); *E21B 43/26* (2013.01)

(56) References Cited

U.S. PATENT DOCUMENTS

| | | | |
|---|---|---|---|
| 4,623,283 A * | 11/1986 | Chew | B65G 5/00 |
| | | | 166/295 |
| 4,988,450 A | 1/1991 | Wingrave et al. | |
| 7,484,564 B2 | 2/2009 | Welton et al. | |
| 7,690,431 B2 | 4/2010 | Nguyen et al. | |
| 7,786,049 B2 | 8/2010 | Temple et al. | |
| 7,934,557 B2 * | 5/2011 | Nguyen | C09K 8/502 |
| | | | 166/285 |
| 8,586,509 B2 | 11/2013 | Welton et al. | |
| 2004/0194961 A1 * | 10/2004 | Nguyen | E21B 43/025 |
| | | | 166/295 |
| 2008/0190614 A1 | 8/2008 | Ballard | |
| 2012/0053092 A1 | 3/2012 | Marangoni et al. | |
| 2013/0053092 A1 | 2/2013 | Laitinen et al. | |
| 2013/0292116 A1 | 11/2013 | Nguyen et al. | |
| 2014/0054033 A1 | 2/2014 | Nguyen et al. | |

* cited by examiner

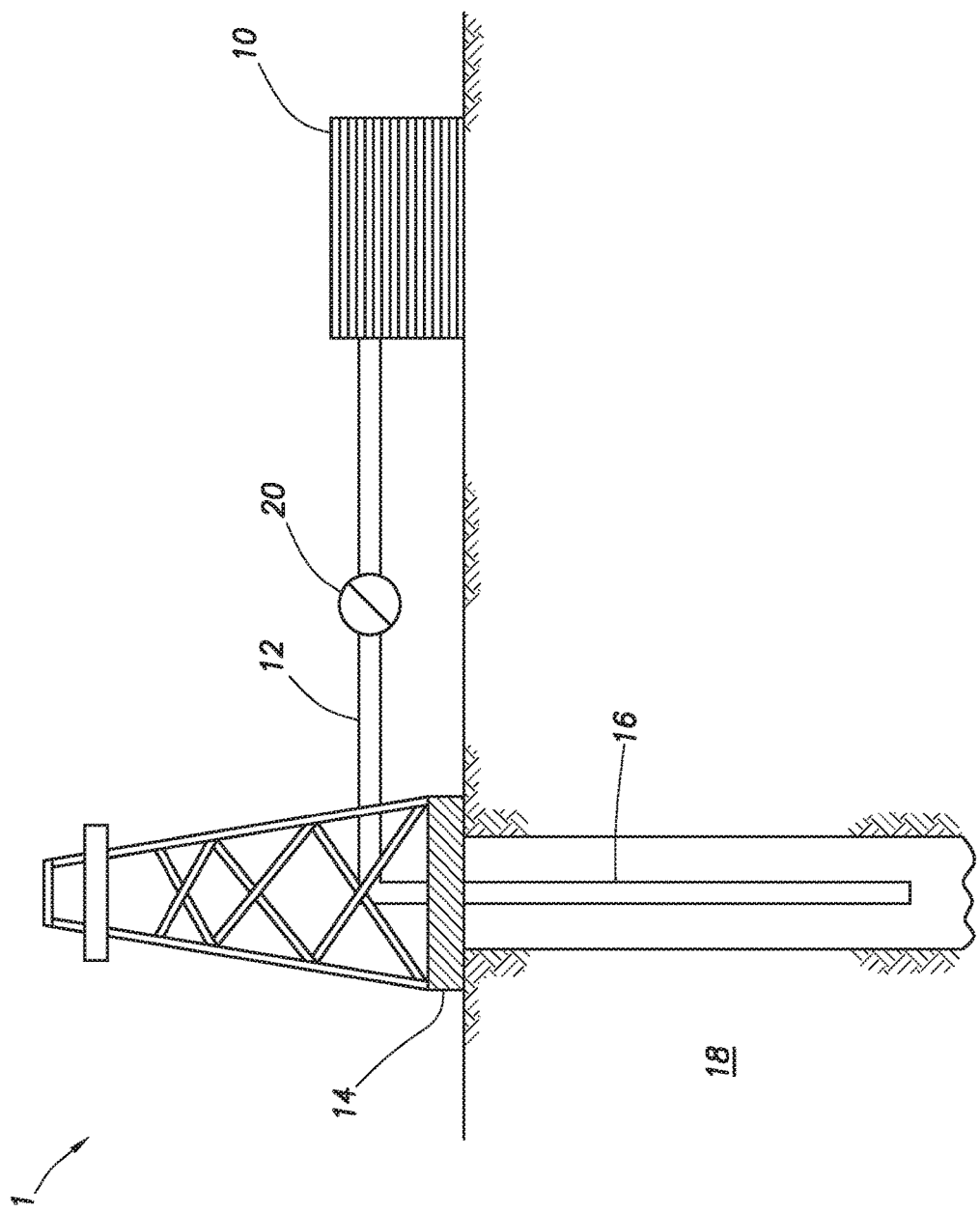

STABILIZING FORMATION LAMINAE IN COAL SEAM WELLBORES

BACKGROUND

The embodiments herein relates to stabilizing formation laminae layers in coal seam wellbores, in particular, to stabilize formation laminae in coal seam wellbores to prevent or reduce the production of eroded material.

Non-traditional sources of hydrocarbons are playing an increasingly important role in the oil and gas industry. Such non-traditional sources include gas hydrates, heavy oil, bitumen, and coal bed methane in coal seams. Coal bed methane in particular is becoming an increasingly important energy source, with the total coal seams in the United States estimated to be between 400 and 850 trillion cubic feet, as well as many trillion cubic feet abroad.

Coal bed methane content in coal seams generally increases the deeper the seam is located in a subterranean formation, as well as with the age of the coal seam. In many instances deep coal seams are located in a formation having a striated or layered profile. For example, coal seams may be located beneath various layers of formation comprising silt, clay, sand, shale, and/or siltstone, among other formation types, as well as aquifers or water tables used for drinking water, for example. The coal seams themselves may be located between such formation layers. These formation layers may be referred to as "laminae" or "formation laminae." Laminae containing excessive clay is particularly susceptible to freshwater contact due its insufficient salinity, allowing more water molecules to occupy the interstitial space between the laminae layers and cause swelling. As a result of such freshwater contact, the laminae may quickly undergo sloughing or other erosion, creating "eroded material," which may be in the form of fine to coarse particulate matter that has become disassociated from the laminae or solubilized material that takes on a viscous paste-like quality in fluid.

In order to extract the methane from a coal seam, a wellbore must be drilled through the laminae and the aquifers to reach the coal seams. Stimulation operations then follow, which may involve hydraulic fracturing, acidizing, fracture acidizing, or combinations thereof. Hydraulic fracturing generally includes injecting or pumping a viscous fracturing fluid into a portion of the subterranean formation at a rate and pressure such that fractures are formed or enhanced into the portion of the subterranean formation. The fracture pressure causes the formation to crack which allows the fracturing fluid to enter and extend the crack further into the formation. The fractures tend to propagate as vertical and/or horizontal cracks located radially outward from the wellbore.

During drilling and stimulation operations, the formation laminae may be exposed to freshwater from the water table through which the wellbore was drilled, thereby forming eroded material. This eroded material may enter the wellbore and interfere with operational equipment (e.g., clogging equipment, for example). The eroded material may also collect within the wellbore, such as within the created fractures and reduce fracture conductivity, thus reducing the methane production of the coal seam wellbore. Moreover, continued exposure to freshwater may result in more and more accumulation of eroded material within the wellbore. Such accumulation may cause the need for frequent and costly, economically and in terms of operator time, workovers or other remedial action. Traditional clay and fines stabilizers have been ineffective at stabilizing the formation laminae when it becomes exposed to freshwater. This may be because stabilizing the laminae may require more than just standard ion exchange by the clay and fines stabilizer, but also physical bonding or cohesion to overcome the expansion caused by the swelling of the laminae when exposed to freshwater.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

The FIGURE depicts an embodiment of a system configured for delivering the treatment fluids of the embodiments described herein to a downhole location.

DETAILED DESCRIPTION

The embodiments herein relates to stabilizing formation laminae layers in coal seam wellbores, in particular, to stabilize formation laminae in coal seam wellbores to prevent or reduce the production of eroded material.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method is provided herein of introducing a treatment fluid into a wellbore in a subterranean formation. The subterranean formation may be of the type used to extract a gas, such as methane gas. As used herein, the term "treatment fluid" refers to any fluid that may be used in an application in conjunction with a desired function and/or for a desired purpose. The term "treatment" does not imply any particular action by the fluid or any component thereof.

The subterranean formation may comprise a coal seam gas reservoir, a freshwater reservoir, and formation laminae. This composition may be in any order and may comprise more than one of any particular component. For example, one or more freshwater reservoirs may be interspersed between one or more formation laminae and one or more coal seam reservoirs may be interspersed between one or more formation laminae. Generally, the freshwater reservoir(s) will be above, or closer to the surface, than the coal seam gas reservoir(s). The wellbore may thus penetrate through the formation laminae, the freshwater reservoir(s), and the coal seam reservoir(s). The wellbore may be openhole, may comprise a slotted liner or wire wrapped screen disposed therein whereby an annulus is formed between the liner or screen and the wellbore, may comprise a liner, may comprise a cased liner (e.g., with cement), or any other configuration suitable for use in a subterranean formation having the characteristics described herein.

The treatment fluid introduced into the wellbore generally comprises an aqueous base fluid and an aqueous curable resin. Once therein, the aqueous curable resin may be penetrate into the formation laminae (e.g., through pores formed therein) from the treatment fluid while the treatment fluid is maintained in the wellbore at a pressure sufficient to prevent the flow of freshwater from the freshwater reservoir and into the wellbore. That is, the treatment fluid is maintained in the wellbore at pressure to prevent migration of the from one layer, such as a freshwater layer, into the wellbore where it may migrate to another layer, such as a formation laminae, and then produce eroded material. Rather, maintaining the pressure while placing the resin keeps the freshwater completely or substantially (i.e., largely, but not necessarily wholly) out of the wellbore while the aqueous curing agent penetrates into the desired formation laminae and cures. Once cured, the formation laminae are less susceptible or resistant to the freshwater (i.e., less susceptible to erosion due to exposure to freshwater), or are "stabilized" into competent formations. The treatment fluid may then be removed from the wellbore and gas (e.g., methane gas) may be recovered from the coal seam reservoir.

In some embodiments, prior to removing the treatment fluid from the wellbore, permeability pathways may be formed in the coal seam gas reservoir itself to facilitate production of the gas from the gas reservoir. The permeability pathways may be in the form of a perforation, fracture, or other means of fluidly communicating the gas in the coal seam gas reservoir with the interior of the wellbore for production to the surface. The pathways may preferably be created using a hydrajetting tool having a jetting fluid expelled therethrough, but other means may be used without departing from the scope of this disclosure, such as with shaped charges, pressurized fluid injected by means other than a hydrajetting tool, and the like.

In some embodiments, the treatment fluid is removed by displacing the treatment fluid from the wellbore (i.e., bring it to the surface) with nitrogen gas. The nitrogen gas itself may be used at a pressure such that it is capable of preventing the flow of freshwater from the water formation and into the wellbore. In other embodiments, the treatment fluid may be removed using coiled tubing. Other means of removing the treatment fluid may also be suitable for use in the methods herein.

A pre-flush fluid may be used in some embodiments to prepare the wellbore or better prepare the wellbore for penetration and curing of the aqueous curable resin. In such embodiments, the pre-flush fluid may comprise an aqueous base fluid and a cationic surfactant. The pre-flush fluid, like the treatment fluid, may be introduced by any means suitable for use in a subterranean formation operation such as, as explained in detail below. In some embodiments, coiled tubing may be used to introduce either or both of the pre-flush fluid and the treatment fluid.

As previously stated, the treatment fluid and the pre-flush fluid may comprise an aqueous base fluid. The aqueous base fluid may be the same or different in the treatment fluid and the pre-flush fluid for use during a particular operation. Suitable aqueous base fluids may include saltwater (e.g., water containing one or more salts dissolved therein), brine (e.g., saturated salt water), seawater, and any combination thereof. Generally, the water that may form part or all of the aqueous base fluid may be from any source, provided that it does not contain components that might adversely affect the stability and/or performance of the treatment fluids. In certain embodiments, the density of the aqueous base fluid may be adjusted to accommodate for a particular operation.

One of ordinary skill in the art, with the benefit of this disclosure, will recognize when such density and/or pH adjustments are appropriate. In some embodiments, the pH range may preferably be from a lower limit of about 4, 5, 6, and 7 to an upper limit of about 11, 10, 9, 8, and 7, encompassing any value and subset therebetween. In preferred embodiments, the pH may range from a lower limit of about 7 to an upper limit of about 9, encompassing any value and subset therebetween.

The treatment fluids described herein may comprise the aqueous base fluid and an aqueous curable resin. Suitable aqueous curable resins for use in the treatment fluids described herein may include, but are not limited to, an epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, and any combination thereof. In some embodiments, the treatment fluids may comprise the aqueous base fluid and the aqueous curable resin in an aqueous based emulsion, where the aqueous base fluid forms the external phase and the aqueous curable resin forms the internal phase of the emulsion.

In some embodiments, the epoxy-based resin may be a two-component epoxy-based resin comprising a liquid hardenable resin component and a liquid hardening agent component. The liquid hardenable resin component may comprise a hardenable resin and an optional solvent. The solvent may be added to the resin to reduce its viscosity for ease of handling, mixing and transferring. It is within the ability of one skilled in the art, with the benefit of this disclosure, to determine if and how much solvent may be needed to achieve a viscosity suitable to the subterranean conditions. Factors that may affect this decision include geographic location of the well, the surrounding weather conditions, the desired long-term stability of the aqueous curable resin, and the like. An alternate way to reduce the viscosity of the hardenable resin is to heat it. The second component is the liquid hardening agent component, which comprises a hardening agent, an optional silane coupling agent, an optional surfactant, and/or an optional hydrolyzable ester.

Examples of hardenable resins that may be used in the liquid hardenable resin component may include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, a polyamide resin, and any combination thereof. In some embodiments, the hardenable resin may comprise a urethane resin.

The hardenable resin may be included in the liquid hardenable resin component in an amount in the range of a lower limit of about 5%, 10%, 20%, 30%, 40%, and 50% to an upper limit of about 100%, 90%, 80%, 70%, 60%, and 50% by weight of the liquid hardenable resin component, encompassing any value and any subset therebetween. It is within the ability of one skilled in the art, with the benefit of this disclosure, to determine how much of the liquid hardenable resin component may be needed to achieve the desired results. Factors that may affect this decision include which type of liquid hardenable resin component and liquid hardening agent component are used.

Examples of the hardening agents that may be used in the liquid hardening agent component may include, but are not limited to, a cyclo-aliphatic amine (e.g., piperazine, derivatives of piperazine (e.g., aminoethylpiperazine), modified piperazines, and the like), an aromatic amine (e.g., methylene dianiline, derivatives of methylene dianiline and hydrogenated forms, 4,4'-diaminodiphenyl sulfone, and the like), an aliphatic amine (e.g., ethylene diamine, diethylene triamine, triethylene tetraamine, tetraethylene pentaamine, and the like), an imidazole, a pyrazole, a pyrazine, a pyrimidine, a pyridazine, a 1H-indazole, a purine, a phthalazine, a naphthyridine, a quinoxaline, a quinazoline, a phenazine, an imidazolidine, a cinnoline, an imidazoline, a 1,3,5-triazine, a thiazole, a pteridine, an indazole, an amine, a polyamine, an amide, a polyamide, a 2-ethyl-4-methyl imidazole, and any combination thereof. The chosen hardening agent often effects the range of temperatures over which a hardenable resin is able to cure. By way of example, and not of limitation, in subterranean formations having a temperature of about 15.6° C. to about 121.1° C. (or about 60° F. to about 250° F.), amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 10° C. (about 50° F.) to as high as about 176.7° C. (about 350° F.).

The hardening agent used may be included in the liquid hardening agent component in an amount sufficient to at least partially harden the resin composition. In some embodiments described herein, the hardening agent used may be included in the liquid hardening agent component in the range of from a lower limit of about 0.1%, 1%, 5%, 10%, 15%, 20%, 25%, 30%, 35%, 40%, and 45% to about 95%, 90%, 85%, 80%, 75%, 70%, 65%, 60%, 55%, 50%, and 45% by weight of the liquid hardening agent component, encompassing any value and any subset therebetween. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating agent may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to the particulates for forming the crosslinker-coated particulates described herein. Examples of suitable silane coupling agents may include, but are not limited to, N-2-(aminoethyl)-3-aminopropyltrimethoxysilane, 3-glycidoxypropyltrimethoxysilane, and any combination thereof. The silane coupling agent may be included in the resin component or the liquid hardening agent component (according to the chemistry of the particular group as determined by one skilled in the art with the benefit of this disclosure). In some embodiments, the silane coupling agent used may be included in the liquid hardening agent component in the range of from a lower limit of about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the liquid hardening agent component, encompassing any value and any subset therebetween.

Any surfactant compatible with the hardening agent may be used in the liquid hardening agent component. Such surfactants may include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, one or more nonionic surfactants, and any combination thereof. Some suitable combinations may include of one or more cationic and nonionic surfactants. The surfactant or surfactants that may be used are included in the liquid hardening agent component in an amount in the range of from a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the liquid hardening agent component, encompassing any value and any subset therebetween.

While not required, examples of hydrolyzable esters that may be used in the liquid hardening agent component may include, but are not limited to, a combination of dimethylglutarate, dimethyladipate, and dimethylsuccinate; dimethylthiolate; methyl salicylate; dimethyl salicylate; and dimethylsuccinate; and any combination thereof. When used, a hydrolyzable ester may be included in the liquid hardening agent component in an amount in the range of from a lower limit about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the liquid hardening agent component, encompassing any value and any subset therebetween. In some embodiments, a hydrolyzable ester may be included in the liquid hardening agent component in an amount in the range of about 1% to about 2.5% by weight of the liquid hardening agent component.

Another suitable aqueous curable resin for use in the embodiments of the present disclosure are furan-based resins. Suitable furan-based resins may include, but are not limited to, furfuryl alcohol resins, furfural resins, combinations of furfuryl alcohol resins and aldehydes, combinations of furan resins and phenolic resins, and any combination thereof. Of these, furfuryl alcohol resins may be preferred. A furan-based resin may be combined with a solvent to control viscosity, if desired. Suitable solvents for use in the furan-based stabilizing agents of the embodiments herein may include, but are not limited to, 2-butoxy ethanol, butyl lactate, butyl acetate, tetrahydrofurfuryl methacrylate, tetrahydrofurfuryl acrylate, esters of oxalic, maleic acid, succinic acid, furfuryl acetate, and any combination thereof. Of these, 2-butoxy ethanol may be preferred. In some embodiments, the furan-based resins suitable for use in the embodiments of the present disclosure may be capable of enduring temperatures well in excess of about 176.7° C. (or about 350° F.) without degrading. In some embodiments, the furan-based resins suitable for use in the embodiments of the present disclosure may be capable of enduring temperatures up to about 371.1° C. (or about 700° F.) without degrading.

Optionally, the furan-based resins suitable for use in the embodiments of the present disclosure may further comprise a curing agent to facilitate or accelerate curing of the furan-based resin at lower temperatures. The presence of a curing agent may be particularly useful in embodiments where the furan-based resin may be placed within subterranean formations having temperatures below about 176.7° C. (or about 350° F.). Examples of suitable curing agents may include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and any combination thereof. In those embodiments where a curing agent is not used, the furan-based resin may cure autocatalytically.

Yet another suitable aqueous curable resin for use in the methods of the embodiments of the present disclosure are phenolic-based resins. Suitable phenolic-based resins may include, but are not limited to, terpolymers of phenol, phenolic formaldehyde resins, a combination of phenolic and furan resins, and any combination thereof. In some embodiments, a combination of phenolic and furan resins may be preferred. A phenolic-based resin may be combined with a solvent to control viscosity if desired. Suitable solvents for use in the embodiments of the present disclosure may include, but are not limited to butyl acetate, butyl lactate, furfuryl acetate, 2-butoxy ethanol, and any combination thereof. Of these, 2-butoxy ethanol may be preferred in some embodiments.

Yet another resin-type material suitable for use in the methods of the embodiments described herein is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant, each range encompassing any value and any subset therebetween. In the phenol/phenol formaldehyde/furfuryl alcohol resins suitable for use as a stabilizing agent in the embodiments described herein, suitable silane coupling agents may include, but are not limited to, N-2-(aminoethyl)-3-aminopropyltrimethoxysilane, 3-glycidoxypropyltrimethoxysilane, and any combination thereof. Suitable surfactants may include, but are not limited to, an ethoxylated nonyl phenol phosphate ester, combinations of one or more cationic surfactants, and one or more nonionic surfactants and an alkyl phosphonate surfactant.

The aqueous curable resin may be present in its entirety (e.g., both portions of the two-component epoxy resin) in an amount in the range of a lower limit of about 0.1%, 1%, 2%, 4%, 6%, 8%, 10%, 12%, 14%, 16%, 18%, 2%, 22%, and 24% to an upper limit of about 50%, 48%, 46%, 44%, 42%, 40%, 38%, 36%, 34%, 32%, 30%, 28%, 26%, and 24% by weight of the treatment fluid, encompassing any value and any subset therebetween.

In some embodiments, as mentioned above, a pre-flush fluid may be used according to one or more embodiments described herein. The pre-flush fluid may comprise an aqueous base fluid, as described above, and a cationic surfactant. The cationic surfactant may comprise any surfactant known in the art that comprises and/or dissociates to form a positively-charged hydrophilic portion. The cationic surfactant may be used to treat the formation to accept the aqueous curable resins described herein, and may additionally serve as clay stabilizers. Examples of suitable cationic surfactants may include, but are not limited to, an alkyl phosphonate, an ethoxylated nonyl phenol phosphonate ester, a alkyl ammonium chloride, trimethylcocoammonium chloride, trimethyltallowammonium chloride, dimethyldicocoammonium chloride, hydroxyalkyl ammonium chloride, bis(2-hydroxyethyl)tallowamine, bis(2-hydroxyethyl)erucylamine, erucyl methyl bis(2-hydroxyethyl)ammonium chloride, bis(2-hydroxyethyl)coco-amine, cetylpyridinium chloride, N,N,N, trimethyl-1-octadecammonium chloride, 1,3-Bis(trimethylammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, a fatty amine salt, an ammonium salt, a quaternary ammonium compound, an alkyl pyridinium salt, any derivative thereof, and any combination thereof.

In some embodiments, the cationic surfactant may be present in the pre-flush fluid in an amount in the range of from a lower limit of about 0.05%, 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5%, encompassing any value and subset therebetween.

Optionally, the treatment fluid may additionally comprise a cationic surfactant, such as those listed above with reference to the pre-flush fluid and in the amount described for use in the pre-flush fluid. Like the use of the cationic surfactant in the pre-flush fluid, the cationic surfactant in the treatment fluid may aid in preparing the formation for penetration and curing of the aqueous curable resin, as well as act as a clay stabilizer.

In some embodiments, a hydrajetting tool may expel a jetting fluid to form permeability channels in the wellbore in coal seam gas reservoir itself. The jetting fluid may be any fluid capable of being expelled from the hydrajetting tool at a rate and pressure sufficient to form the permeability channels. In some embodiments, an aqueous base fluid, such as one suitable for use in the treatment fluids or pre-flush fluids described herein may be used alone. The fluid itself may be capable of forming the permeability channels. In other embodiments, a cutting agent may be included in the aqueous base fluid to aid in forming the permeability channels. Generally, the cutting agent may include, but is not limited to, cutting sand, proppant, or any combination thereof. Suitable materials for proppant may include, but are not limited to, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. The cutting agent may be of any shape and size, provided that it is capable of being expelled from the hydrajetting tool without clogging it.

In some embodiments, either or both of the pad-fluid and the treatment fluid may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids and pre-flush fluids described herein to a downhole location are described. In various embodiments, the systems can comprise a pump fluidly coupled to a tubular, the tubular containing the treatment fluids and pre-flush fluids described herein. It will be appreciated that while the system described below may be used for delivering either or both of the treatment fluids and the pre-flush fluids, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids and pre-flush fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids and pre-flush fluids to the high pressure pump. In such embodiments, the low pressure pump may "step up" the pressure of the treatment fluids and pre-flush fluids before reaching the high pressure pump.

In some embodiments, the systems described herein can further comprise a mixing tank that is upstream of the pump and in which the treatment fluids and pre-flush fluids are formulated. In various embodiments, the pump (e.g., a low pressure pump, a high pressure pump, or a combination thereof) may convey the treatment fluids and pre-flush fluids from the mixing tank or other source of the treatment fluids and pre-flush fluids to the tubular. In other embodiments, however, the treatment fluids and pre-flush fluids may be formulated offsite and transported to a worksite, in which case the treatment fluid and pre-flush fluid may be introduced to the tubular via the pump directly from its shipping container (e.g., a truck, a railcar, a barge, or the like) or from a transport pipeline. In either case, the treatment fluids and pre-flush fluids may be drawn into the pump, elevated to an appropriate pressure, and then introduced into the tubular for delivery downhole.

The FIGURE shows an illustrative schematic of a system that can deliver the treatment fluids and pre-flush fluids of the present disclosure to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which the treatment fluids and pre-flush fluids of the embodiments herein may be formulated. The treatment fluids and pre-flush fluids may be conveyed via line 12 to wellhead 14, where the treatment fluids and pre-flush fluids enter tubular 16, tubular 16 extending from wellhead 14 into subterranean formation 18. Upon being ejected from tubular 16, the treatment fluids and pre-flush fluids may subsequently penetrate into subterranean formation 18. Pump 20 may be configured to raise the pressure of the treatment fluids and pre-flush fluids to a desired degree before introduction into tubular 16. It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the treatment fluid and pre-flush fluid may, in some embodiments, flow back to wellhead 14 and exit subterranean formation 18. In some embodiments, the treatment fluid and pre-flush fluid that has flowed back to wellhead 14 may subsequently be recovered and recirculated to subterranean formation 18.

It is also to be recognized that the disclosed treatment fluids and pre-flush fluids may also directly or indirectly affect the various downhole equipment and tools that may come into contact with the treatment fluids and pre-flush fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

A. A method comprising: introducing a treatment fluid into a wellbore in a subterranean formation, wherein the subterranean formation includes a coal seam gas reservoir, a freshwater reservoir, and formation laminae interposed therebetween, and the wellbore penetrating each, and wherein the treatment fluid comprises an aqueous base fluid and an aqueous curable resin; penetrating at least a portion of the formation laminae with the aqueous curable resin while maintaining the treatment fluid in the wellbore at a pressure sufficient to prevent the flow of freshwater from the freshwater reservoir into the wellbore; curing the aqueous curable resin, thereby stabilizing the formation laminae; removing the treatment fluid from the wellbore; and recovering gas from the coal seam gas reservoir.

B. A method comprising: introducing a treatment fluid into a wellbore in a subterranean formation, wherein the subterranean formation includes a coal seam gas reservoir, a freshwater reservoir, and formation laminae interposed therebetween, and the wellbore penetrating each, and wherein the treatment fluid comprises an aqueous base fluid and an aqueous curable resin; penetrating at least a portion of the formation laminae with the aqueous curable resin while maintaining the treatment fluid in the wellbore at a pressure sufficient to prevent the flow of freshwater from the freshwater reservoir into the wellbore; curing the aqueous curable resin, thereby stabilizing the formation laminae; creating permeability pathways in the coal seam gas reservoir itself; removing the treatment fluid from the wellbore; recovering gas from the coal seam gas reservoir.

Each of embodiments A and B may have one or more of the following additional elements in any combination:

Element 1: Wherein the aqueous curable resin is selected from the group consisting of an epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, a polyamide resin, and any combination thereof.

Element 2: Wherein the aqueous curable resin is present in an amount of about 0.1% to about 50% by weight of the treatment fluid.

Element 3: Wherein the wellbore is open-hole.

Element 4: Wherein a slotted liner or wire wrapped screen is disposed in the wellbore, thereby forming an annulus between the wellbore and the slotted liner or wire wrapped screen.

Element 5: Wherein a pre-flush fluid is introduced into the wellbore prior to the step of: introducing the treatment fluid into the wellbore in the subterranean formation, and wherein the pre-flush fluid comprises a second aqueous base fluid and a cationic surfactant.

Element 6: Wherein the cationic surfactant is selected from the group consisting of an alkyl phosphonate, an ethoxylated nonyl phenol phosphonate ester, a alkyl ammonium chloride, trimethylcocoammonium chloride, trimethyltallowammonium chloride, dimethyldicocoammonium chloride, hydroxyalkyl ammonium chloride, bis(2-hydroxyethyl)tallowamine, bis(2-hydroxyethyl)erucylamine, erucyl methyl bis(2-hydroxyethyl)ammonium chloride, bis(2-hydroxyethyl)coco-amine, cetylpyridinium chloride, N,N,N, trimethyl-1-octadecammonium chloride, 1,3-Bis(trimethyl-ammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, a fatty amine salt, an ammonium salt, a quaternary ammonium compound, an alkyl pyridinium salt, any derivative thereof, and any combination thereof.

Element 7: Wherein the step of: removing the treatment fluid from the wellbore, comprises displacing the treatment fluid from the wellbore with nitrogen gas, the nitrogen gas capable of maintaining the wellbore at a pressure sufficient to prevent the flow of freshwater from the freshwater reservoir into the wellbore.

Element 8: Wherein coiled tubing is used to perform the step of: removing the treatment fluid from the wellbore.

Element 9: Further comprising a wellhead with a tubular extending therefrom and into the wellbore, and a pump fluidly coupled to the tubular, wherein the step of: introducing the treatment fluid into the wellbore in the subterranean formation, comprises introducing the treatment fluid through the tubular.

Element 10: Wherein a jetting fluid is ejected through a hydrajetting tool to perform the step of: creating permeability pathways in the coal seam gas reservoir itself.

By way of non-limiting example, exemplary combinations applicable to A and B include: A with 1 and 2; A with 5, 6, and 10; A with 3, 5, and 6; A with 8 and 9; B with 4, 5, and 6; B with 7 and 9; B with 2, 3, and 8.

To facilitate a better understanding of the embodiments of the present disclosure, the following examples of preferred or representative embodiments are given. In no way should the following examples be read to limit, or to define, the scope of the disclosure.

EXAMPLE 1

Shale/sand formation chuck samples from a coal seam-containing wellbore in eastern Australia were tested using traditional clay and fines stabilizers to determine their effectiveness at reducing or preventing the formation of eroded material. Each chuck sample was about 1.27 cm×3.81 cm (0.5 in×1.5 in) and was soaked in 100 mL of a fluid composition in 7% KCl brine according to Table 1 below for 30 minutes under vacuum conditions. Thereafter, the fluid composition was decanted or otherwise removed and replaced with freshwater in the same volume to determine the effect of the freshwater on the core.

TABLE 1

| Sample No. | Fluid Composition |
|---|---|
| 1 | Tap water (Control) |
| 2 | 7% KCl brine |
| 3 | 5% of an hydroxyalkyl ammonium chloride cationic surfactant |
| 4 | 3% of an ammonium chloride cationic surfactant |
| 5 | 5% hydroxyalkyl ammonium chloride cationic surfactant + 5% polyamide-based aqueous emulsion resin |

TABLE 1-continued

| Sample No. | Fluid Composition |
|---|---|
| 6 | 5% hydroxyalkyl ammonium chloride cationic surfactant + 3% alkyl ammonium chloride cationic surfactant |
| 7 | 5% hydroxyalkyl ammonium chloride cationic surfactant + 3% alkyl ammonium chloride cationic surfactant + 5% polyamide-based aqueous emulsion resin |

The treated samples were visually observed after exposure to freshwater after the passage of 24 hours and 48 hours. After 24 hours, clear eroded material in the form of particulates or paste was observed in each of the samples, although Samples 2, 4, and 6 appeared to produce eroded material upon exposure to freshwater at a slower pace. However, after 48 hours immersed in the freshwater, all of the samples had transformed from solid core samples to eroded material.

EXAMPLE 2

Shale/sand formation chuck samples from a coal seam-containing wellbore in eastern Australia were tested using treatment fluids comprising the aqueous curable resins of the present disclosure to determine their effectiveness at reducing or preventing the formation of eroded material. Each chuck sample was 1.27 cm×3.81 cm (0.5 in×1.5 in) and first was soaked under vacuum in 100 mL of an aqueous base fluid containing 7% w/v of KCl and 0.5% of an ethoxylated nonyl phenol phosphonate ester cationic surfactant for 5 minutes. After the soaking period, the chuck samples were removed and placed in an aqueous curable resin composition according to Table 2 below for 30 minutes under vacuum conditions. Each "resin" listed in Table 2 is an epoxy-based aqueous emulsion resin. After the 30-minute period, the chuck samples were allowed to remain in the aqueous curable resin composition without vacuuming at 43° C. (100° F.) for 72 hours to allow the resin to cure. After curing, the each chuck sample was immersed in 100 mL of freshwater.

TABLE 2

| Sample No. | Fluid Composition |
|---|---|
| 1 | 1:32 dilution of resin:7% KCl |
| 2 | 1:16 dilution of resin:7% KCl |
| 3 | 1:8 dilution of resin:7% KCl |
| 4 | 1:4 dilution of resin:7% KCl |
| 5 | 1:2 dilution of resin:7% KCl |

The treated samples were visually observed after exposure to freshwater after the passage of 5 hours, 22 hours, 24 hours, 48 hours, and 7 days. After the passage of each time point, little or no eroded material was observed for each sample, even the highly diluted 1:32 sample. That is, the core samples remained substantially (largely but not necessarily wholly) intact, even after 7 days. Accordingly, the cured aqueous curable resin disclosed herein was able to prevent or substantially reduce the formation of eroded material from the core samples.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
introducing a treatment fluid into a wellbore in a subterranean formation,
wherein the subterranean formation includes a coal seam gas reservoir, a freshwater reservoir, and formation laminae interposed therebetween, and the wellbore penetrating each,
and wherein the treatment fluid comprises an aqueous base fluid and an aqueous curable resin;
penetrating at least a portion of the formation laminae with the aqueous curable resin;
maintaining the treatment fluid in the wellbore at a pressure sufficient to prevent the flow of freshwater from the freshwater reservoir into the wellbore;
while maintaining the pressure, curing the aqueous curable resin, thereby stabilizing the formation laminae;
removing the treatment fluid from the wellbore; and
recovering gas from the coal seam gas reservoir.

2. The method of claim 1, wherein the aqueous curable resin is selected from the group consisting of an epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, a polyamide resin, and any combination thereof.

3. The method of claim 1, wherein the aqueous curable resin is present in an amount of about 0.1% to about 50% by weight of the treatment fluid.

4. The method of claim 1, wherein the wellbore is open-hole.

5. The method of claim 1, wherein a slotted liner or wire wrapped screen is disposed in the wellbore, thereby forming an annulus between the wellbore and the slotted liner or wire wrapped screen.

6. The method of claim 1, wherein a pre-flush fluid is introduced into the wellbore prior to the step of: introducing the treatment fluid into the wellbore in the subterranean formation, and wherein the pre-flush fluid comprises a second aqueous base fluid and a cationic surfactant.

7. The method of claim 6, wherein the cationic surfactant is selected from the group consisting of an alkyl phosphonate, an ethoxylated nonyl phenol phosphonate ester, a alkyl ammonium chloride, trimethylcocoammonium chloride, trimethyltallowammonium chloride, dimethyldicocoammonium chloride, hydroxyalkyl ammonium chloride, bis(2-hydroxyethyl)tallowamine, bis(2-hydroxyethyl)erucylamine, erucyl methyl bis(2-hydroxyethyl)ammonium chloride, bis(2-hydroxyethyl)coco-amine, cetylpyridinium chloride, N,N,N, trimethyl-1-octadecammonium chloride, 1,3-Bis(trimethylammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, a fatty amine salt, an ammonium salt, a quaternary ammonium compound, an alkyl pyridinium salt, any derivative thereof, and any combination thereof.

8. The method of claim 1, wherein the step of: removing the treatment fluid from the wellbore, comprises displacing the treatment fluid from the wellbore with nitrogen gas, the nitrogen gas capable of maintaining the wellbore at a pressure sufficient to prevent the flow of freshwater from the freshwater reservoir into the wellbore.

9. The method of claim 1, wherein coiled tubing is used to perform the step of: removing the treatment fluid from the wellbore.

10. The method of claim 1, further comprising a wellhead with a tubular extending therefrom and into the wellbore, and a pump fluidly coupled to the tubular,
wherein the step of: introducing the treatment fluid into the wellbore in the subterranean formation, comprises introducing the treatment fluid through the tubular.

11. A method comprising:
introducing a treatment fluid into a wellbore in a subterranean formation,
wherein the subterranean formation includes a coal seam gas reservoir, a freshwater reservoir, and formation laminae interposed therebetween, and the wellbore penetrating each,
and wherein the treatment fluid comprises an aqueous base fluid and an aqueous curable resin;
penetrating at least a portion of the formation laminae with the aqueous curable resin;
maintaining the treatment fluid in the wellbore at a pressure sufficient to prevent the flow of freshwater from the freshwater reservoir into the wellbore;
while maintaining the pressure, curing the aqueous curable resin, thereby stabilizing the formation laminae;
creating permeability pathways in wellbore in the coal seam gas reservoir itself;
removing the treatment fluid from the wellbore;
recovering gas from the coal seam gas reservoir.

12. The method of claim 11, wherein the aqueous curable resin is selected from the group consisting of an epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, a polyamide resin, and any combination thereof.

13. The method of claim 11, wherein the aqueous curable resin is present in an amount of about 0.1% to about 50% by weight of the treatment fluid.

14. The method of claim 11, wherein the wellbore is open-hole.

15. The method of claim 11, wherein a slotted liner or wire wrapped screen is disposed in the wellbore, thereby forming an annulus between the wellbore and the slotted liner or wire wrapped screen.

16. The method of claim 11, wherein a pre-flush fluid is introduced into the wellbore prior to the step of: introducing the treatment fluid into the wellbore in the subterranean formation, and wherein the pre-flush fluid comprises a second aqueous base fluid and a cationic surfactant.

17. The method of claim 16, wherein the cationic surfactant is selected from the group consisting of an alkyl phosphonate, an ethoxylated nonyl phenol phosphonate ester, a alkyl ammonium chloride, trimethylcocoammonium chloride, trimethyltallowammonium chloride, dimethyldicocoammonium chloride, hydroxyalkyl ammonium chloride, bis(2-hydroxyethyl)tallowamine, bis(2-hydroxyethyl)erucylamine, erucyl methyl bis(2-hydroxyethyl)ammonium chloride, bis(2-hydroxyethyl)coco-amine, cetylpyridinium chloride, N,N,N, trimethyl-1-octadecammonium chloride, 1,3-Bis(trimethylammonium)-2-hydroxy propane, 1,3-Bis(triethylammonium)-2-hydroxy propane, 1,3-Bis(dimethyl, ethylammonium)-2-hydroxy propane, 1,3-Bis(tripropylammonium)-2-hydroxy propane, a fatty amine salt, an ammonium salt, a quaternary ammonium compound, an alkyl pyridinium salt, any derivative thereof, and any combination thereof.

18. The method of claim 11, wherein a jetting fluid is ejected through a hydrajetting tool to perform the step of: creating permeability pathways in the coal seam gas reservoir itself.

19. The method of claim 11, wherein the step of: removing the treatment fluid from the wellbore, comprises displacing the treatment fluid from the wellbore with nitrogen gas, the nitrogen gas capable of maintaining the wellbore at a pressure sufficient to prevent the flow of freshwater from the freshwater reservoir into the wellbore.

20. The method of claim 11, further comprising a wellhead with a tubular extending therefrom and into the wellbore, and a pump fluidly coupled to the tubular,
wherein the step of: introducing the treatment fluid into the wellbore in the subterranean formation, comprises introducing the treatment fluid through the tubular.

* * * * *